Patented Mar. 16, 1954

2,672,442

UNITED STATES PATENT OFFICE 2,672,442

TREATMENT OF BLUE BENTONITE AND PRODUCT THEREOF

Arthur G. Clem, Chicago, Ill., assignor to American Colloid Company, Chicago, Ill., a corporation of South Dakota No Drawing. Application February 1, 1952, Serial No. 269,597

15 Claims. (Cl. 252—8.5)

This invention relates to methods of improving certain grades of Wyoming type, swelling bentonite; and more particularly to the treatment of so-called blue bentonite so as to improve its color and its capacity as a suspending agent, and thereby to make it more acceptable for industrial uses for which the so-called yellow bentonites are presently preferred.

In accordance with common usage among miners in the Black Hills regions of South Dakota and Wyoming, I shall designate herein as blue bentonite the generally blue-gray, pale to deeply colored material which occurs in more deep-lying strata than does the more widely used, greenish-yellow to cream colored, swelling bentonite. The latter I shall designate herein as yellow bentonite.

Hitherto blue bentonites have been largely rejected in industries that make use of the swelling, gelling and viscous mud producing properties of commercial yellow bentonites, because blue bentonites are generally deficient in such necessary colloidal properties. I have discovered, however, that if a blue bentonite be treated with a dilute aqueous solution of a salt of an alkaline earth metal, preferably calcium and magnesium, in the manner to be described, a marked improvement in its colloidal properties, together with a change in its color toward yellow, results. My discovery is quite the opposite of what would be expected from present-day knowledge concerning the common yellow variety of swelling sodium bentonite, which readily loses its capacity to swell in water when it is treated with a calcium salt. My discovery, however, finds a logical explanation in my observation that the ratio of sodium to combined calcium and magnesium in a blue bentonite is higher than it is in a yellow bentonite. I postulate, therefore, that a blue bentonite, when subjected to my novel treatment, exhibits a maximum capacity to swell in water when the ratio of sodium to combined calcium and magnesium therein has been reduced to an optimum.

A principal object of my invention, therefore, is to provide a method for treating blue bentonite so as to yield a product that possesses substantially improved colloidal properties and that is of a dominantly yellow color.

Another object is to provide a new clay product in the form of processed blue bentonite which possesses substantially improved colloidal properties and is of a dominantly yellow color.

Another object is to provide a processed blue bentonite that possesses a like degree of utility with that of yellow bentonite in forming oil well drilling muds.

Another object is to provide a method of treating blue bentonite so that the product thereof will exhibit a substantial increase in viscosity of its aqueous dispersion over that of untreated blue bentonite.

Other objects and advantages of my invention will appear as the description thereof proceeds.

It is to be understood that my use of the word "bentonite" in the present description and in my claims, unless the context clearly indicates otherwise, is limited to clays of the type that occur in the Black Hills regions of South Dakota and Wyoming. Bentonites possessing entirely different properties from those of the blue and the yellow bentonites, and variously designated as Southern bentonite, non-swelling bentonite, and calcium bentonite, occur in scattered areas throughout the United States.

The blue bentonites, which I may subject to my novel method of processing, vary from low test to high test, measured in terms of their respective viscosities when determined by methods known to the art. A blue bentonite which, in a 6.25 per cent dispersion in water, has a viscosity of about 7 centipoises (cp.) I designate as low test. A blue bentonite, which has a viscosity of about 24 cp. under like conditions of test, I designate as high test. In processing blue bentonites of low, medium or high test my essential objects are to produce (1) substantial increases in their respective viscosities, and (2) a change in color to one that is dominantly yellow.

The sump water, which collects in pits from which yellow bentonite has been mined, contains gypsum in solution, along with minor quantities of magnesium salts; the total content of such salts in the sump water being below 0.25 per cent, and making the latter adaptable for use in my preferred mode of practicing my invention. In my later description herein, as well as in my claims, my use of the term "sump water," without more, will mean sump water from the source, and containing salts of the character, and in the proportions, that I have just stated.

I may, if desired, substitute for the sump water a treating solution comprising a prepared aqueous solution of one or more salts of calcium and magnesium with strong acids, such as hydrochloric, nitric and sulfuric acids, that is, the chlorides, nitrates and sulfates of those two metals. With the exception of calcium sulfate which I ordinarily employ in the form of commercial gypsum, all of the salts just named are readily soluble in water. When I prepare a treating solution containing one or more of the salts aforenamed, I prefer a very dilute solution of the same, that is, a concentration of a single salt if only one is used, and a combined concentration if more than one salt is used, of only a fraction of one per cent, preferably ranging from about 0.05 per cent to about 0.25 per cent. For example, in treating blue bentonite with a prepared solution, the latter may be made up with a calcium salt alone or with a magnesium salt alone or with both a calcium salt and a magnesium salt. Where the latter two salts are used together, their combined concentrations are preferably kept within the range above stated for a single salt. In general, the lower the test of a raw blue bentonite (in terms of viscosity) the higher will be the concentration of the treating solution within the range above stated. In my claims, however, my use of the term "a very dilute solution" will mean an aqueous solution of a total salt concentration between about 0.05 per cent and about 0.25 per cent.

The starting material, which I treat by my novel method is raw blue bentonite which has been air dried and then broken up into relatively small lumps, or which has been dried and fragmented in the usual type of drier, and which, if desired, may be subsequently ground. In my later description herein, as well as in my claims, my use of the term "dried blue bentonite" will mean a raw blue bentonite which has been dried in any suitable manner so that its content of free water is from about 7 per cent to about 22 per cent.

In carrying out my novel method of treating blue bentonite I proceed preferably as follows: A known weight of dried blue bentonite, which may be several tons, is spread out in a layer about 6 inches thick, to form spaced areas, each of a size to permit of its surface being sprayed with the treating liquid. Alternatively, the dried bentonite may be spread out in a layer about 2 feet in thickness in which parallel furrows are formed for receiving the treating liquid.

The bentonite then is permitted to absorb from about 10 per cent to about 30 per cent of its weight of the aforementioned sump water, which is sprayed over the surface of the 6-inch layer, or which is run in suitable quantity into each furrow in the 2-foot layer. The treated bentonite then is allowed to dry until its moisture content is below about 30 per cent, or so that it may be readily broken up into substantially non-adherent lumps. It next is stirred up with a harrow or other suitable implement, and is prepared for a second treatment in the manner above described for the first treatment. Following the second application of treating solution to the bentonite, it again is allowed to dry to about the same point as that after the first treatment.

An important part of my invention is based upon my discovery that, after the application of sump water or of a substitute treating solution to blue bentonite in the manner just described, a subsequent treatment of the dried product, of a well-defined yellow color, with plain water of potable quality, ordinarily is as effective in enhancing the viscosity of the product as is an additional application of the treating solution. Accordingly, the dried product, following ordinarily upon a second application of treating solution to the starting material, is stirred up, spread out for treatment as aforedescribed, and then treated with water in an amount from about 20 per cent to about 30 per cent of the weight of the clay. After a final drying to the extent aforestated, the product may be collected in a stock pile; or it may be dried to less than 10 per cent of moisture by heat in the usual manner, following which it is ground and sacked.

From the foregoing description it will be understood that, as a measure of economy in cost and in time, the number of treatments of a given blue bentonite will be kept down to the minimum which will achieve the essential objects of my invention. The optimum number of applications of sump water or of other solution—whether one, two, or three—required by a particular batch of blue bentonite may be gauged by a variety of tests. Treatment ordinarily should be stopped (1) when about one-half or more of the bentonite has become definitely yellow in color; or (2) when the viscosity of initially low or medium test blue bentonite has increased by 100 per cent or more; or (3) when a sample exhibits upon thermal analysis a well-defined endothermic break in the region of 700 degrees centigrade.

The following examples illustrate results that I have obtained in the practice of my invention, using solutions of calcium sulfate and of magnesium sulfate, each of 0.22 per cent concentration; and employing the same, as well as water, in quantites corresponding to about 25 per cent of the weight of the blue bentonite being treated. After each treatment the clay was dried to remove the major part of the added water.

*Example 1.*—A raw, pale blue bentonite, of viscosity 16.0 cp., after two treatments with calcium sulfate solution, yielded a product of yellow color and of viscosity 37.8 cp. This was the optimum treatment; for, when part of this product was treated a third time with the calcium sulfate solution, the viscosity of the resulting material dropped to 25.0 cp., but without perceptible change from its yellow color. Again, when another part of the product of two treatments with calcium sulfate solution was subjected to a single treatment with water, the viscosity dropped slightly, to 34.8 cp.; and, after two treatments with water, the viscosity dropped further to 29.3 cp. These results, however, are consistent with my theory that the maximum increase in colloidality of blue bentonite, as measured by the increase in its viscosity, is effected by causing it to adsorb and to retain an optimal proportion of calcium ions, that is, a proportion which is neither too high nor too low.

*Example 2.*—Since I expect that improved blue bentonites, which embody my invention, may be used in forming oil well drilling muds, my results, as set forth in this example are computed in terms of the number of barrels of 15-centipoise drilling mud that could be obtained from a ton of the treated blue bentonite.

(a) The results of various treatments of a blue bentonite, having an initial drilling mud yield of 85.8 barrels, are presented in the following summary:

No. 1: One treatment with calcium sulfate—91.6 barrels.

No. 2: Two treatments with calcium sulfate—94.9 barrels.

No. 3: Three treatments with calcium sulfate—102.0 barrels.

No. 4: No. 2 plus one treatment with water—104.2 barrels.

No. 5: No. 2 plus two treatments with water—106.2 barrels.

No. 6: No. 3 plus one treatment with water—104.2 barrels.

(b) This is substantially a repetition of (a), except that the starting material was a blue bentonite having a drilling mud yield of 98.4 barrels. The results were:

No. 1: One treatment with calcium sulfate—104.2 barrels.
No. 2: Two treatments with calcium sulfate—110.4 barrels.
No. 3: Three treatments with calcium sulfate—106.2 barrels.
No. 4: No. 2 plus one treatment with water—108.3 barrels.
No. 5: No. 2 plus two treatments with water—109.3 barrels.
No. 6: No. 3 plus one treatment with water—108.3 barrels.

The blue bentonites were changed in color to a definite yellow after the second treatment with the calcium sulfate solution.

*Example 3.*—In this example are summarized the results of treatments (a) of a low grade of blue bentonite, of viscosity 9.0 cp., and (b) of a medium grade of blue bentonite, of viscosity 11.0 cp., with a 0.22 per cent aqueous solution of magnesium sulfate, followed in two instances by a treatment with water. The results were:

(a)

No. 1: One treatment with magnesium sulfate—10.8 cp.
No. 2: Two treatments with magnesium sulfate—15.5 cp.
No. 3: Three treatments with magnesium sulfate—21.5 cp.
No. 4: No. 2 plus one treatment with water—23.8 cp.

(b)

No. 1: One treatment with magnesium sulfate—14.3 cp.
No. 2: Two treatments with magnesium sulfate—22.0 cp.
No. 3: Three treatments with magnesium sulfate—26.3 cp.
No. 4: No. 2 plus one treatment with water—26.5 cp.

Instead of the treatment of a layer of dried blue bentonite with sump water, or with a prepared solution as previously described, there may be scattered over and incorporated with the bentonite, in any suitable manner, one or more salts of the aforementioned group, preferably powdered gypsum or magnesium sulfate, or a mixture of the two, in an amount ranging from about one pound to about five pounds per ton of bentonite. The bentonite, with the above salt or salt mixture incorporated therein, is then permitted to absorb from about 10 per cent to about 30 per cent of its weight of water, which is applied to the bentonite as previously described. After subsequent drying and stirring up with a harrow or the like, the treatment of the bentonite with the powdered salt, followed by the wetting step, may be repeated. The treated bentonite again is allowed to dry. If desired, it then may be treated with water and dried in the same manner as described above in the case of blue bentonite that has been treated with sump water or other salt solution.

As previously indicated herein, I do not limit myself to the use of the sulfates of calcium and magnesium, but I may also employ the chlorides and nitrates of those two metals. While I have described the preferred mode of practicing my invention and I have stated the essential characteristics of my novel product, it will be apparent that variations and modifications thereof may be made without departing from the underlying principles of the invention. I therefore desire, by the following claims to include within the scope of the invention all such variations and modifications by which substantially the results of my invention may be obtained through the use of substantially the same or equivalent means.

I claim:

1. The method which comprises, treating dried blue bentonite clay with sump water in an amount from about 10 per cent to about 30 per cent of the weight of the clay, and drying the clay so treated.

2. The method which comprises, subjecting dried blue bentonite clay to a plurality of sequential treatments, each said treatment consisting essentially of the steps of (a) treating the clay with sump water in an amount from about 10 per cent to about 30 per cent of the weight of the clay, and (b) drying the treated clay until it fragments readily to form substantially non-adherent lumps.

3. The method which comprises, treating dried blue bentonite clay with sump water in an amount from about 10 per cent to about 30 per cent of the weight of the clay, drying the treated clay until it fragments readily to form substantially non-adherent lumps, contacting the dried product with water in an amount up to about 30 per cent of the weight of said product, and drying the water-treated product.

4. The method which comprises, first subjecting dried blue bentonite clay to a plurality of sequential treatments, each said treatment consisting essentially of the steps of (a) treating the clay with sump water in an amount from about 10 per cent to about 30 per cent of the weight of the clay, and (b) drying the treated clay until it fragments readily to form substantially non-adherent lumps; thereafter contacting the dried product of said treatments with water in an amount up to about 30 per cent of the weight of said product, and drying the water-treated product.

5. The method which comprises, treating dried blue bentonite clay with an amount, from about 10 per cent to about 30 per cent of the weight of the clay, of a very dilute solution of a salt of the group consisting of the chlorides, nitrates, and sulfates of calcium and of magnesium, and drying the clay so treated.

6. The method which comprises, subjecting dried blue bentonite clay to a plurality of sequential treatments, each said treatment consisting essentially of the steps of (a) treating the clay with an amount, from about 10 per cent to about 30 per cent of the weight of the clay, of a very dilute solution of a salt of the group consisting of the chlorides, nitrates, and sulfates of calcium and of magnesium, and (b) drying the treated clay until it fragments readily to form substantially non-adherent lumps.

7. The method which comprises, treating dried blue bentonite clay with an amount, from about 10 per cent to about 30 per cent of the weight of the clay, of a very dilute solution of a salt of the group consisting of the chlorides, nitrates, and sulfates of calcium and of magnesium, drying the treated clay until it fragments readily to form substantially non-adherent lumps, contacting the dried product with water in an amount up to about 30 per cent of the weight of said product, and drying the water-treated product.

8. The method which comprises, subjecting dried blue bentonite clay to a plurality of sequential treatments, each said treatment consisting essentially of the steps of (a) treating the clay with an amount, from about 10 per cent to about 30 per cent of the weight of the clay, of a very dilute solution of a salt of the group consisting of the chlorides, nitrates, and sulfates of calcium and of magnesium, and (b) drying the treated clay until it fragments readily to form substantially non-adherent lumps; thereafter contacting the dried product of said treatments with water in an amount up to about 30 per cent of the weight of said product, and drying the water-treated product.

9. The method which comprises, incorporating with dried blue bentonite clay from about one pound to about 5 pounds, per ton of the clay, of a substantially dry material from the group consisting of the chlorides, nitrates, and sulfates of calcium and of magnesium, treating the clay and incorporated material with water in an amount up to about 30 per cent of the weight of the clay, and drying the clay so treated.

10. The method which comprises, subjecting dried blue bentonite clay to a plurality of sequential treatments, each said treatment consisting essentially of the steps of (a) incorporating with the clay from about one pound to about 5 pounds, per ton of the clay, of a substantially dry material from the group consisting of the chlorides, nitrates, and sulfates of calcium and of magnesium, (b) treating the clay and incorporated material with water in an amount up to about 30 per cent of the weight of the clay, and (c) drying the treated clay until it fragments readily to form substantially non-adherent lumps.

11. The method which comprises, incorporating with dried blue bentonite clay from about one pound to about 5 pounds, per ton of the clay, of a substantially dry material from the group consisting of the chlorides, nitrates and sulfates of calcium and of magnesium, treating the clay and incorporated material with water in an amount up to about 30 per cent of the weight of the clay, drying the treated clay until it fragments readily to form substantially non-adherent lumps, contacting the dried product with water in an amount up to about 30 per cent of the weight of said product, and drying the water-treated product.

12. The method which comprises, subjecting dried blue bentonite clay to a plurality of sequential treatments, each said treatment consisting essentially of the steps of (a) incorporating with the clay from about one pound to about 5 pounds, per ton of the clay, of a substantially dry material from the group consisting of the chlorides, nitrates, and sulfates of calcium and of magnesium, (b) treating the clay and incorporated material with water in an amount up to about 30 per cent of the weight of the clay, and (c) drying the treated clay until it fragments readily to form substantially non-adherent lumps; thereafter contacting the dried product of said treatments with water in an amount up to about 30 per cent of the weight of said product, and drying the water-treated product.

13. An article of manufacture, comprising dried, natural blue bentonite which has been subjected to successive wetting and drying in the presence of an added soluble salt of a metal of the group consisting of calcium and magnesium; the number of said wettings and dryings and the amount of said soluble salt being sufficient to lower substantially the ratio of sodium to combined calcium and magnesium in said blue bentonite and to change the color thereof to a dominantly yellow color.

14. An article of manufacture, comprising dried, natural blue bentonite which has been subjected to successive wetting and drying in the presence of an added soluble salt of a metal of the group consisting of calcium and magnesium; the number of said wettings and dryings and the amount of said soluble salt being sufficient at least to double the viscosity of the initial dried blue bentonite when tested in a 6.25 per cent aqueous dispersion.

15. A manufactured product for use in preparing oil well drilling muds, comprising dried, natural blue bentonite which has been subjected to successive wetting and drying in the presence of an added soluble salt of a metal of the group consisting of calcium and magnesium; the number of said wettings and dryings and the amount of said soluble salt being such that each ton of said product is adapted to yield not less than 100 barrels of 15-centipoise drilling mud.

ARTHUR G. CLEM.

References Cited in the file of this patent

UNITED STATES PATENTS

| Number | Name | Date |
| --- | --- | --- |
| 2,393,174 | Larsen | Jan. 15, 1946 |